United States Patent
Takahama et al.

(10) Patent No.: US 11,146,697 B2
(45) Date of Patent: Oct. 12, 2021

(54) IMAGE FORMING SYSTEM AND IMAGE FORMING APPARATUS WITH VOICE INSTRUCTION TO REFORM PRINT SETTING OPERATION

(71) Applicant: Konica Minolta Inc., Tokyo (JP)

(72) Inventors: Hidekazu Takahama, Nagoya (JP); Kazuhiro Ishiguro, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/919,706

(22) Filed: Jul. 2, 2020

(65) Prior Publication Data

US 2021/0021722 A1    Jan. 21, 2021

(30) Foreign Application Priority Data

Jul. 18, 2019    (JP) .............................. JP2019-132971

(51) Int. Cl.
*H04N 1/00* (2006.01)
*G06F 3/16* (2006.01)
*H04N 1/327* (2006.01)

(52) U.S. Cl.
CPC ..... *H04N 1/00403* (2013.01); *H04N 1/00411* (2013.01); *G06F 3/167* (2013.01); *H04N 1/32784* (2013.01)

(58) Field of Classification Search
None
See application file for complete search history.

(56) References Cited

U.S. PATENT DOCUMENTS

| | | | |
|---|---|---|---|
| 7,006,241 B1* | 2/2006 | Yamamoto | H04N 1/00209 358/1.15 |
| 2006/0181750 A1* | 8/2006 | Lu | H04N 1/00466 358/527 |
| 2015/0317109 A1* | 11/2015 | Kirihata | G06F 3/167 358/1.15 |
| 2016/0037009 A1* | 2/2016 | Ito | H04N 1/00923 358/1.14 |
| 2019/0155551 A1* | 5/2019 | Fukumoto | G06F 3/167 |
| 2019/0156825 A1* | 5/2019 | Shiga | G10L 15/22 |

FOREIGN PATENT DOCUMENTS

| | | |
|---|---|---|
| JP | 8-44520 A | 2/1996 |
| JP | 11-353076 A | 12/1999 |
| JP | 2007-18090 A | 1/2007 |

* cited by examiner

*Primary Examiner* — Haris Sabah
(74) *Attorney, Agent, or Firm* — Rankin, Hill & Clark LLP

(57) ABSTRACT

An image forming system includes: a display panel; a voice inputter that receives an instruction by voice; and a hardware processor that: analyzes a voice content that has been received by the voice inputter; determines input regarding setting of at least one or more of preliminarily provided adjustment functions based on an analysis result from the hardware processor; determines whether the voice content contains input of a setting value of a corresponding adjustment function based on a determination result from the hardware processor; and displays a selection screen on the display panel based on a determination result from the hardware processor when the voice content does not contain the input of a setting value of a corresponding adjustment function.

11 Claims, 16 Drawing Sheets

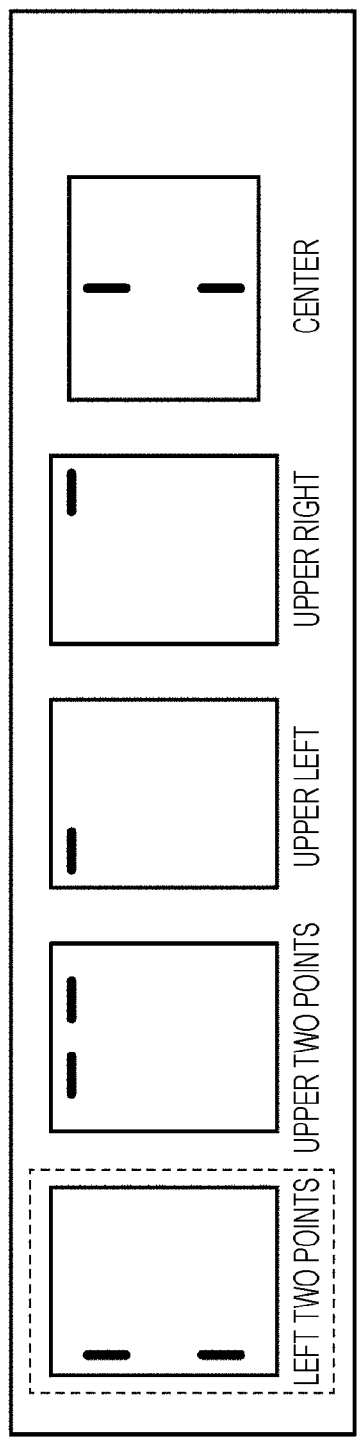
FIG. 8A
FIG. 8B

IMAGE FORMING SYSTEM AND IMAGE FORMING APPARATUS WITH VOICE INSTRUCTION TO REFORM PRINT SETTING OPERATION

The entire disclosure of Japanese patent Application No. 2019-132971, filed on Jul. 18, 2019, is incorporated herein by reference in its entirety.

BACKGROUND

Technological Field

The present disclosure relates to an image forming system and an image forming apparatus, and more particularly, to an image forming system and an image forming apparatus capable of giving an operation instruction by using voice

Description of the Related Art

There has been proposed an apparatus that outputs, for example, appropriate operation guidance in accordance with the operation skill level of a user (see JP H8-44520 A and JP H11-353076 A).

There has arisen an apparatus capable of giving an operation instruction to an operation panel in accordance with voice that has been uttered by a user and that represents an operation instruction content, in addition to giving an operation instruction to the operation panel by the user pressing a touch panel (see JP 2007-18090 A).

In contrast, it may be desirable to display a confirmation screen for a user even when an operation instruction is given in accordance with voice to an operation panel mounted in an image forming apparatus.

For example, in the case where setting at an absolute value is difficult, for example, the case of an image quality adjustment function, it may be desirable to actually confirm, for a user, an instruction content to check whether image quality has been adjusted in an imaged manner.

SUMMARY

The present disclosure has been made in view of the above-described background, and relates to an image forming system and an image forming apparatus capable of appropriately displaying a confirmation screen to a user in accordance with an instruction content.

To achieve the abovementioned object, according to an aspect of the present invention, an image forming system reflecting one aspect of the present invention comprises: a display panel; a voice inputter that receives an instruction by voice; and a hardware processor that: analyzes a voice content that has been received by the voice inputter; determines input regarding setting of at least one or more of preliminarily provided adjustment functions based on an analysis result from the hardware processor; determines whether the voice content contains input of a setting value of a corresponding adjustment function based on a determination result from the hardware processor; and displays a selection screen on the display panel based on a determination result from the hardware processor when the voice content does not contain the input of a setting value of a corresponding adjustment function.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 8A and 8B illustrate a finishing adjustment function of the image forming apparatus according to the embodiment;

DETAILED DESCRIPTION OF EMBODIMENTS

Hereinafter, an embodiment of a technical idea according to the present invention will be described with reference to the drawings. However, the scope of the invention is not limited to the disclosed embodiments. In the following description, the same parts are denoted by the same signs. Their names and functions are the same. Detailed description thereof will thus not be repeated.

In the following embodiment, an image forming apparatus includes, for example, an MFP, a printer, a copier, and a facsimile.

[1. Configuration of Image Forming Apparatus 1]

Figure 1:
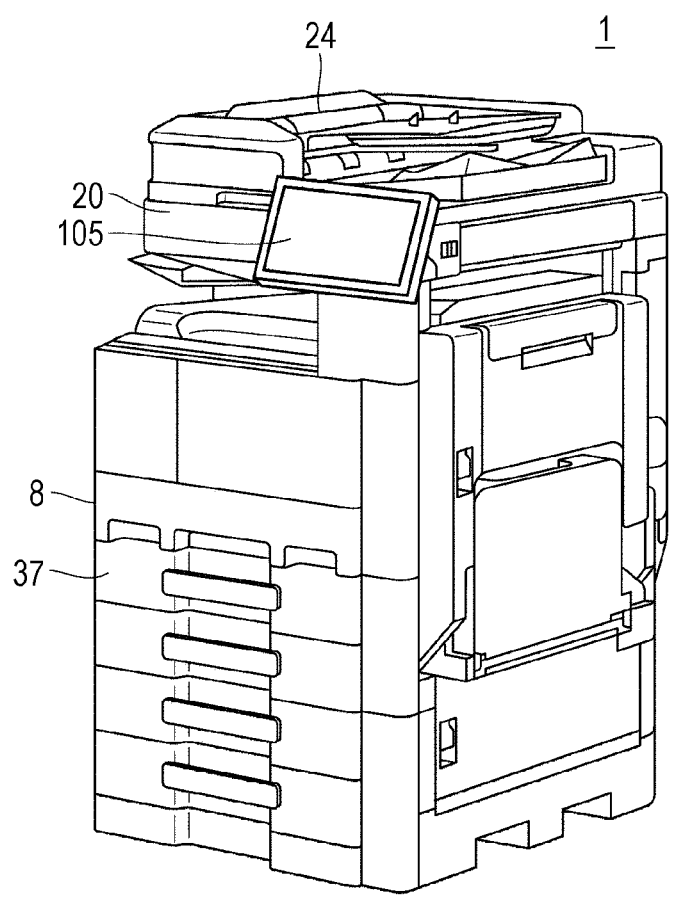
FIG. 1 illustrates the appearance of an image forming apparatus.

FIG. 1 illustrates the appearance of an image forming apparatus 1.

Referring to FIG. 1, the image forming apparatus 1 is described as a color printer. Although the image forming apparatus 1 as a color printer will be described below, the image forming apparatus 1 is not limited to color printers. For example, the image forming apparatus 1 may be a monochrome printer, or a combined machine (so-called multi functional peripheral (MFP)) of a monochrome or color printer and a facsimile.

The image forming apparatus 1 includes a scanner 20 and a printer 25. The scanner 20 serves as an image reader. An auto document feeder (ADF) 24 is provided in the scanner 20. A cassette 37 for storing paper is provided in the printer 25.

The image forming apparatus 1 includes a display panel 105 for displaying various setting operations and information regarding the image forming apparatus 1. The display panel 105 is provided on the front side of the image forming apparatus 1.

Figure 2:
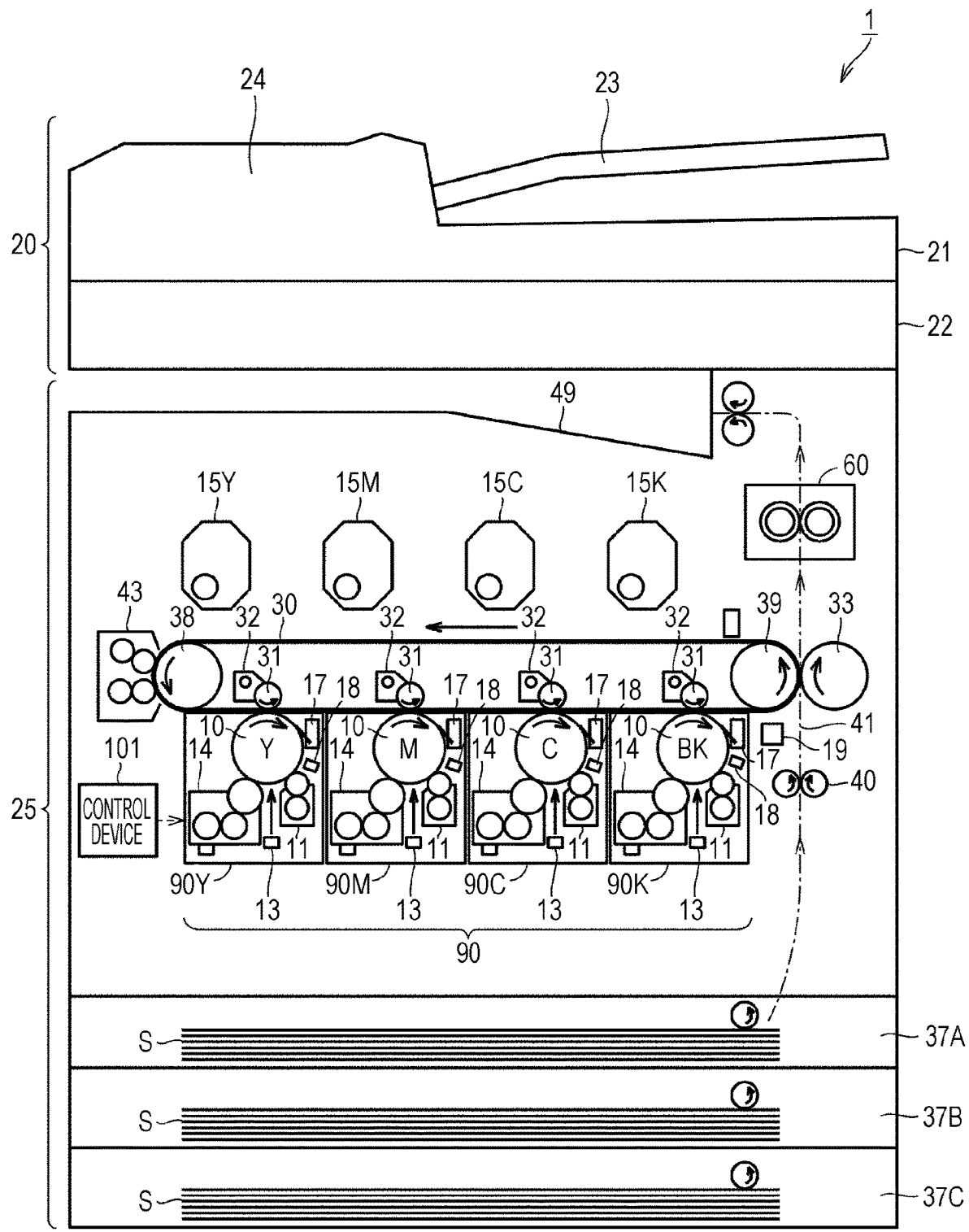
FIG. 2 illustrates the configuration of the image forming apparatus.

FIG. 2 illustrates the configuration of the image forming apparatus 1.

Referring to FIG. 2, the scanner 20 is provided in an upper part of the image forming apparatus 1. The scanner 20 includes a cover 21, a paper table 22, a tray 23, and an ADF 24. One end of the cover 21 is fixed to the paper table 22. The cover 21 can be opened and closed with the end serving as a fulcrum. An operator can set a document on the paper table 22 by opening the cover 21. When receiving a scan instruction with a document being set on the paper table 22, the image forming apparatus 1 starts scanning the document set on the paper table 22. When receiving a scan instruction with a document being set on the tray 23, the image forming apparatus 1 automatically reads the document with the ADF 24 one by one.

The printer 25 includes image forming units 90Y, 90M, 90C, and 90K, an image density control (IDC) sensor 19, a transfer belt 30, a primary transfer roller 31, a transfer drive machine 32, a secondary transfer roller 33, cassettes 37A to 37C, a driven roller 38, a driving roller 39, a timing roller 40, a cleaning unit 43, and a fixing device 60.

The image forming units 90Y, 90M, 90C, and 90K are arranged in order along the transfer belt 30. The image forming unit 90Y is supplied toner from a toner bottle 15Y, and forms a toner image of yellow (Y). The image forming unit 90M is supplied toner from a toner bottle 15M, and forms a toner image of magenta (M). The image forming unit 90C is supplied toner from a toner bottle 15C, and forms a toner image of cyan (C). The image forming unit 90K is supplied toner from a toner bottle 15K, and forms a toner image of black (BK).

The image forming units 90Y, 90M, 90C, and 90K are disposed along the transfer belt 30 in the order of the rotation direction of the transfer belt 30. Each of the image forming units 90Y, 90M, 90C, and 90K includes a rotatable photoreceptor 10, a charging device 11, an exposure device 13, a developing device 14, a cleaning unit 17, and a toner sensor 18.

After each of the image forming units 90Y, 90M, 90C, and 90K operates as described above, a toner image of yellow (Y), a toner image of magenta (M), a toner image of cyan (C), and a toner image of black (BK) are superimposed in order by transfers of the transfer drive machine 32, and transferred from the photoreceptor 10 to the transfer belt 30. This causes a color toner image to be formed on the transfer belt 30.

The IDC sensor 19 detects the density of the toner image formed on the transfer belt 30. Typically, the IDC sensor 19 is a light intensity sensor including a reflection-type photo sensor, and detects the intensity of light reflected from the surface of the transfer belt 30.

The transfer belt 30 is wound around the driven roller 38 and the driving roller 39. The driving roller 39 is connected to a motor (not illustrated). The driving roller 39 is rotated by controlling the motor. The transfer belt 30 and the driven roller 38 rotate in conjunction with the driving roller 39. This causes the toner image on the transfer belt 30 to be sent to the secondary transfer roller 33.

Different sizes of paper are set in the cassettes 37A to 37C. Paper is one example of a recording medium. Paper is sent by the timing roller 40 one by one from any of the cassettes 37A to 37C to the secondary transfer roller 33 along a conveyance path 41. The transfer voltage applied to the secondary transfer roller 33 is controlled in accordance with the timing when paper is sent.

The secondary transfer roller 33 applies transfer voltage having a polarity opposite to the charging polarity of the toner image to the paper being conveyed. As a result, the toner image is attracted from the transfer belt 30 to the secondary transfer roller 33, and the toner image on the transfer belt 30 is transferred. The timing roller 40 controls the timing of conveying paper to the secondary transfer roller 33 in accordance with the position of the toner image on the transfer belt 30. As a result, the toner image on the transfer belt 30 is transferred to an appropriate position on the paper.

A fixing device 70 presses and heats paper passing through the fixing device 70. This operation fixes the toner image on the paper. The paper is then discharged to a tray 49.

The cleaning unit 43 collects toner remaining on the surface of the transfer belt 30 after the toner image is transferred from the transfer belt 30 to the paper. The collected toner is conveyed by a conveyance screw (not illustrated), and stored in a waste toner container (not illustrated).

[2. Hardware Configuration]

Figure 3:
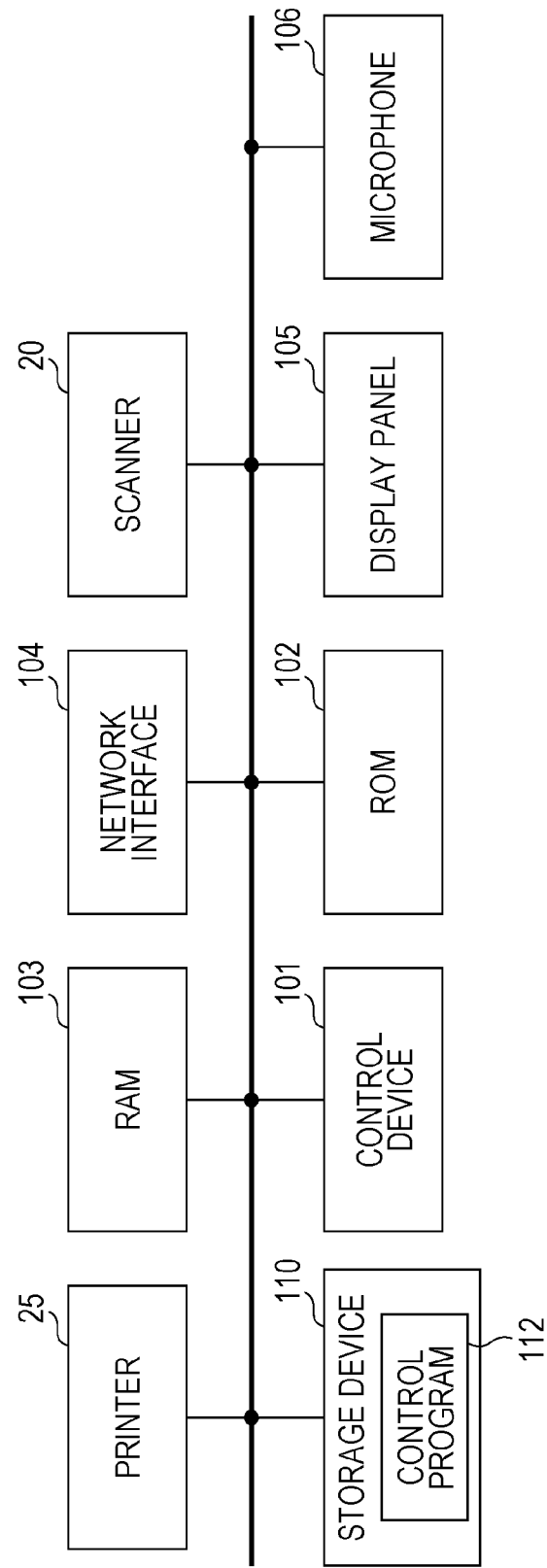
FIG. 3 is a block diagram illustrating the main hardware configuration of the image forming apparatus.

FIG. 3 is a block diagram illustrating the main hardware configuration of the image forming apparatus 1.

One example of the hardware configuration of the image forming apparatus 1 will be described with reference to FIG. 3.

In addition to the scanner 20 and the printer 25, the image forming apparatus 1 includes a control device 101, a read only memory (ROM) 102, a random access memory (RAM) 103, a network interface 104, the display panel 105, a microphone 106, and a storage device 110.

The control device 101 includes, for example, at least one integrated circuit. The integrated circuit includes, for example, at least one central processing unit (CPU), at least one application specific integrated circuit (ASIC), at least one field programmable gate array (FPGA), or a combination thereof.

The control device 101 controls the operation of the image forming apparatus 1 by executing various programs, such as a program 112, for adjusting a control parameter of the image forming apparatus 1.

The control device 101 reads the program 112 from the storage device 110 to the RAM 103 based on the reception of an instruction to execute the program 112. The RAM 103 functions as a working memory, and temporarily stores various pieces of data necessary for executing the program 112.

For example, an antenna (not illustrated) and a wireless module are connected to the network interface 104. The image forming apparatus 1 exchanges data with an external communication device via the antenna or the wireless module. The external communication device includes, for example, a mobile communication terminal, such as a smartphone, and a server. The image forming apparatus 1 may be configured so as to download the program 112 from the server via the antenna.

The display panel 105 includes a display and a touch panel. The display and the touch panel are overlaid on each other, and receive an operation to the image forming apparatus 1 by a touch operation. The display panel 105 can not only receive a setting operation but provide various pieces of information to a user.

The storage device 110 is, for example, a hard disk, a solid state drive (SSD), or another storage device. The storage device 110 may be of either a built-in type or an external type. The storage device 110 stores, for example, the program 112 according to the present embodiment. Note, however, that the location for storing the program 112 is not limited to the storage device 110, and the program 112 may be stored in, for example, a storage area (e.g., cache) of the control device 101, the ROM 102, the RAM 103, and an external device (e.g., server).

The program 112 may be provided not as a single program but by being incorporated in a part of any program. In this case, the control processing according to the present embodiment is performed in cooperation with any program. Even a program that does not include such a part of module does not depart from the gist of the program 112 according to the present embodiment.

A part or all of the functions provided by the program 112 may be implemented by dedicated hardware. The image forming apparatus 1 may be configured in a form like a so-called cloud service in which at least one server executes a part of processing of the program 112.

The microphone 106 receives voice input.

Figure 4:
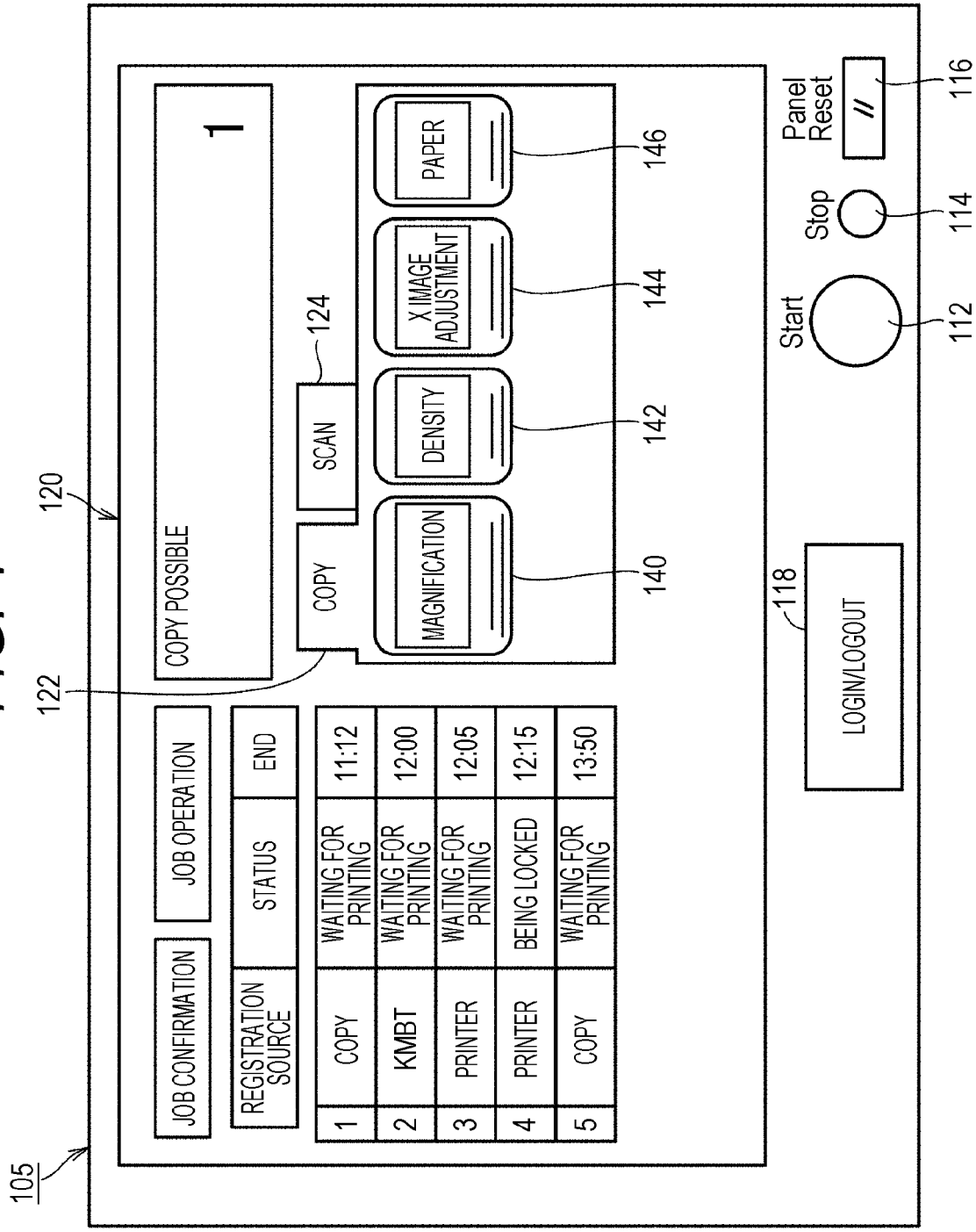
FIG. 4 illustrates a display panel of the image forming apparatus.

FIG. 4 illustrates the display panel 105 of the image forming apparatus 1.

Referring to FIG. 4, the display panel 105 includes a start key 112, a stop key 114, a panel reset key 116, a login/logout button 118, and a main display region 120.

The start key 112 is used to start an operation such as copy/scan. The stop key 114 is used to give an instruct to stop the copy/scan operation. The panel reset key 116 is used to discard a set mode and job. The login/logout button 118 is used to give login input or logout input at the time of operating the display panel 105.

A touch panel is attached to the main display region 120 for executing, for example, display and setting of various modes.

The touch panel enables an operator to perform various settings in accordance with a display content in the main display region 120. A button for performing a basic/applied setting at the time of executing a copy operation and a scan operation is usually disposed in a setting screen region in the touch panel. When each button is pressed, a hierarchical screen for a detailed setting is displayed.

In the example, various detailed setting regions for executing a copy operation are described in one example. An icon 140, an icon 142, an icon 144, and an icon 146 are provided in the region. The icon 140 is used for adjusting magnification. The icon 142 is used for adjusting density. The icon 144 is used for adjusting an image. The icon 146 is used for setting paper.

Although, in the example, the icons for various detailed settings when a copy operation is executed have been described, a similar detailed setting region is displayed for a scan operation.

Job information that has been input to the image forming apparatus 1 at that time is displayed in the job information screen region on the left. The displays are arranged in the order of the jobs to be executed. When an operation of, for example, deletion and change is performed for a specific job, a job number button of an operation target is pressed after a job operation button is selected. A job operation screen is displayed by these operations, and an operation for a specific job becomes possible.

A copy key 122 and a scan key 124 are selection keys for setting in which mode of the copy/scanner the image forming apparatus 1 is operated.

When the copy key 122 is pressed, the image forming apparatus 1 can be used as a copy machine. In this state, the scanner operation cannot be performed.

When the scan key 124 is pressed, the image forming apparatus 1 serves as a scanner. In this state, the copy operation cannot be performed.

The copy key 122 and the scan key 124 cause exclusive operation, and when one is selected, the other is automatically deselected.

In the present embodiment, operation for various settings of the display content displayed on the display panel 105 is executed by voice input using the microphone 106 without using the touch panel. When voice is input, the function of the touch panel may be disabled, or both voice input and input using the touch panel may be enabled.

[3. Functional Block]

Figure 5:
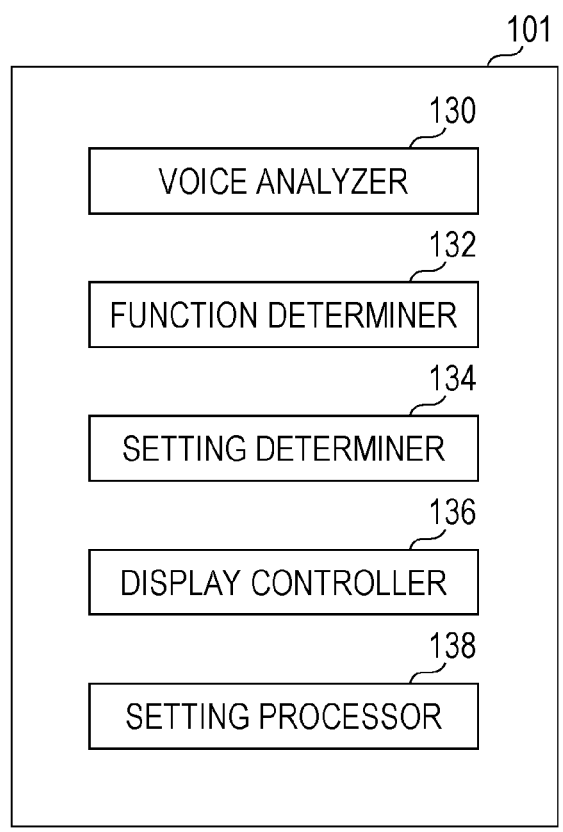
FIG. 5 illustrates functional blocks of the image forming apparatus according to an embodiment.

FIG. 5 illustrates functional blocks of the image forming apparatus 1 according to the embodiment.

Referring to FIG. 5, the control device 101 implements a functional block that executes various functions by executing the program 112 stored in storage device 110.

The control device 101 includes a voice analyzer 130, a function determiner 132, a setting determiner 134, a display controller 136, and a setting processor 138.

The voice analyzer 130 analyzes the voice content of the voice input received at the microphone 106.

The function determiner 132 determines which of a plurality of functions preliminarily set in the image forming apparatus 1 has been selected based on the analysis result from the voice analyzer 130. For example, the function determiner 132 determines whether a setting of one of a plurality of adjustment functions provided in the image forming apparatus 1 has been input.

The setting determiner 134 determines whether the voice content contains the input of a setting value of the selected function, which has been determined by the function determiner 132. For example, the setting determiner 134 determines whether the voice content contains the input of the setting value of the selected adjustment function.

The display controller 136 executes control of displaying (outputting) various display contents on the display panel 105. For example, when the voice content does not contain the input of the setting value of the selected adjustment function, the display controller 136 displays a selection screen on the display panel 105.

The setting processor 138 performs setting processing for various adjustment functions.

[4. Adjustment Function]

The adjustment function of the image forming apparatus 1 according to the embodiment will be described.

Figure 6A:
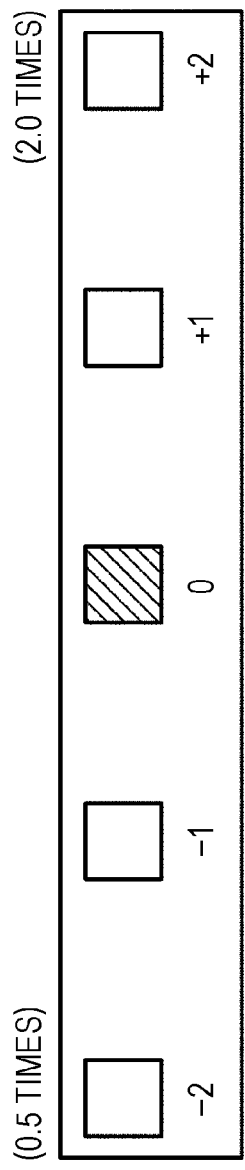
FIGS. 6A and 6B illustrate a brightness adjustment function of the image forming apparatus according to the embodiment.
Figure 6B:
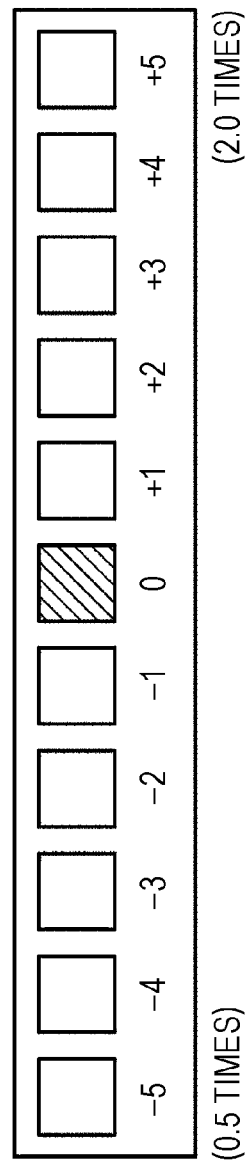

FIGS. 6A and 6B illustrate a brightness adjustment function of the image forming apparatus 1 according to the embodiment.

The brightness adjustment function is a function of adjusting the brightness of image data. In one example, the brightness of image data can be adjusted to 0.5 to 2.0 times by the brightness adjustment function according to the present embodiment.

FIG. 6A illustrates a case where adjustment steps are set at ±2 steps as the brightness adjustment function of the image forming apparatus 1.

For example, when a voice input ("brightness adjustment +2") is input via the microphone 106, the image forming apparatus 1 outputs the voice input to the voice analyzer 130. The voice analyzer 130 analyzes the voice content of the voice input. The function determiner 132 determines that the brightness adjustment function is selected based on the voice content of the voice input ("brightness adjustment") based on the analysis result from the voice analyzer 130. The setting determiner 134 determines whether a setting value (adjustment step ("+2")) of the brightness adjustment has been input based on the analysis result from the voice analyzer 130. The setting determiner 134 determines that the setting value ("+2") has been input, and outputs the setting content to the setting processor 138. The setting processor 138 adjusts the brightness of image data in accordance with the input of the setting value ("+2"). Specifically, the brightness of the image data is adjusted to be doubled.

In another example, when a voice input ("brightness adjustment −2") is input via the microphone 106, the image forming apparatus 1 outputs the voice input to the voice analyzer 130. The voice analyzer 130 analyzes the voice content of the voice input. The function determiner 132 determines that the brightness adjustment function is selected based on the voice content of the voice input ("brightness adjustment") based on the analysis result from the voice analyzer 130. The setting determiner 134 determines whether a setting value (adjustment step ("−2")) of the brightness adjustment has been input based on the analysis result from the voice analyzer 130. The setting determiner 134 determines that the setting value ("−2") has been input, and outputs the setting content to the setting processor 138. The setting processor 138 adjusts the brightness of image data in accordance with the input of the setting value ("−2"). Specifically, the brightness of the image data is adjusted to be multiplied by 0.5.

FIG. 6B illustrates a case where adjustment steps are set at ±5 steps as the brightness adjustment function of the image forming apparatus 1.

For example, when a voice input ("brightness adjustment +5") is input via the microphone 106, the image forming apparatus 1 outputs the voice input to the voice analyzer 130. The voice analyzer 130 analyzes the voice content of the voice input. The function determiner 132 determines that the brightness adjustment function is selected based on the voice content of the voice input ("brightness adjustment") based on the analysis result from the voice analyzer 130. The setting determiner 134 determines whether a setting value (adjustment step ("+5")) of the brightness adjustment has been input based on the analysis result from the voice analyzer 130. The setting determiner 134 determines that the setting value ("+5") has been input, and outputs the setting content to the setting processor 138. The setting processor 138 adjusts the brightness of image data in accordance with the input of the setting value ("+5"). Specifically, the brightness of the image data is adjusted to be doubled.

In another example, when a voice input ("brightness adjustment −5") is input via the microphone 106, the image forming apparatus 1 outputs the voice input to the voice analyzer 130. The voice analyzer 130 analyzes the voice content of the voice input. The function determiner 132 determines that the brightness adjustment function is selected based on the voice content of the voice input ("brightness adjustment") based on the analysis result from the voice analyzer 130. The setting determiner 134 determines whether a setting value (adjustment step ("−5")) of the brightness adjustment has been input based on the analysis result from the voice analyzer 130. The setting determiner 134 determines that the setting value ("−5") has been input, and outputs the setting content to the setting processor 138. The setting processor 138 adjusts the brightness of image data in accordance with the input of the setting value ("−5"). Specifically, the brightness of the image data is adjusted to be multiplied by 0.5.

The number of adjustment steps can be set to any number depending on the type of the image forming apparatus 1.

In contrast, the voice content of the voice input that has been input via the microphone 106 sometimes does not contain a setting value. In one example, it is assumed that a setting value (+6) is not provided.

For example, when a voice input ("brightness adjustment +6") is input via the microphone 106, the image forming apparatus 1 outputs the voice input to the voice analyzer 130. The voice analyzer 130 analyzes the voice content of the voice input. The function determiner 132 determines that the brightness adjustment function is selected based on the voice content of the voice input ("brightness adjustment") based on the analysis result from the voice analyzer 130. The setting determiner 134 determines whether a setting value of the brightness adjustment has been input based on the analysis result from the voice analyzer 130. The setting determiner 134 determines that a setting value has not been input. When determining that a setting value has not been input, the setting determiner 134 outputs the fact to the display controller 136.

When a setting value has not been input, the display controller 136 displays a selection screen on the display panel 105.

Figure 7:
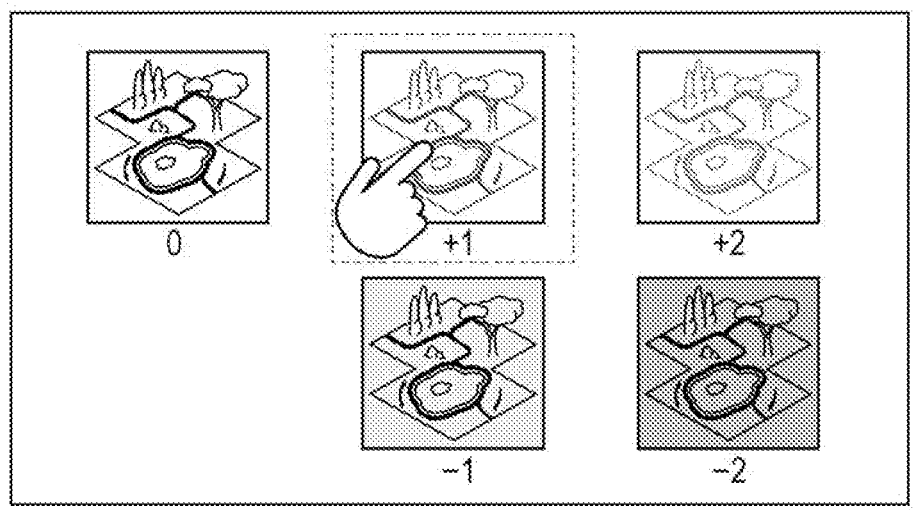
FIG. 7 illustrates a selection screen for brightness adjustment according to the embodiment.

FIG. 7 illustrates a selection screen for brightness adjustment according to the embodiment.

Referring to FIG. 7, in the example, a case where the brightness adjustment function of ±2 steps in FIG. 6A is provided will be described.

Five setting candidates whose brightness has been adjusted are displayed as preview images on the selection screen in the example.

Specifically, the display controller 136 displays a preview image whose brightness has been adjusted in accordance with setting values ("−2 to +2") on the display panel 105.

A user can select one of the plurality of setting candidates displayed on the display panel 105 via a touch panel. In the example, a state in which a preview image whose brightness has been adjusted in accordance with a setting value ("+1") is selected is illustrated.

Although, in the example, a case where a setting candidate can be selected via the touch panel has been described, this is not a limitation. The setting candidate can be selected by voice input via the microphone 106. For example, when the voice input ("+1") is input via the microphone 106, it is determined that a preview image ("+1") whose brightness has been adjusted is selected, and the brightness of the image data is adjusted.

When the voice input ("0" or "default") is input via the microphone 106, it is determined that a preview image ("0") whose brightness has not been adjusted is selected, and the brightness of the image data is adjusted.

Although, in the example, the brightness adjustment function has been described as one example, the disclosure can be similarly applied to other functions. For example, the disclosure can be applied to a contrast adjustment function. The contrast adjustment function is a function of adjusting the degree of change in brightness from white to black. The same applies to other image quality adjustment functions. For example, the same applies to image quality adjustment functions for saturation, hue, color balance, background skipping, and sharpness.

When the voice input ("+1") is input via the microphone 106, it is determined that a preview image ("+1") whose brightness has been adjusted is selected, and the brightness of the image data is adjusted.

FIGS. 8A and 8B illustrate a finishing adjustment function of the image forming apparatus 1 according to the embodiment.

The finishing adjustment function is a function of adjusting a finishing process after image data is printed on paper. For example, a function of adjusting a staple position for stapling sheets of paper is one example of the finishing adjustment function.

In one example, a staple position for stapling a plurality of sheets of paper can be adjusted by the staple position adjustment function according to the embodiment.

FIG. 8A illustrates a case where two-point stapling is possible as a staple adjustment function of the image forming apparatus 1. In the example, a case where five types of staple adjustments are set is illustrated. Specifically, "left two points", "upper two points", "upper left", "upper right", and "center" are illustrated as staple positions.

For example, when a voice input ("staple adjustment left two points") is input via the microphone 106, the image forming apparatus 1 outputs the voice input to the voice analyzer 130. The voice analyzer 130 analyzes the voice content of the voice input. The function determiner 132 determines that the staple adjustment function has been selected based on the voice content of the voice input ("staple adjustment") based on the analysis result from the voice analyzer 130. The setting determiner 134 determines whether a setting value ("left two points") of the staple adjustment has been input based on the analysis result from the voice analyzer 130. The setting determiner 134 determines that the setting value ("left two points") has been input, and outputs the setting content to the setting processor 138. The setting processor 138 sets the staple position to the left two points in accordance with the input of the setting value ("left two points"). Specifically, a plurality of sheets of paper are stapled at positions of left two points.

FIG. 8B illustrates a case where one-point stapling is possible as a staple adjustment function of the image forming apparatus 1. In the example, a case where two types of staple adjustments are set is illustrated.

For example, when a voice input ("staple adjustment upper right") is input via the microphone 106, the image forming apparatus 1 outputs the voice input to the voice analyzer 130. The voice analyzer 130 analyzes the voice content of the voice input. The function determiner 132 determines that the staple adjustment function has been selected based on the voice content of the voice input ("staple adjustment") based on the analysis result from the voice analyzer 130. The setting determiner 134 determines whether a setting value ("upper right") of the staple adjustment has been input based on the analysis result from the voice analyzer 130. The setting determiner 134 determines that the setting value ("upper right") has been input, and outputs the setting content to the setting processor 138. The setting processor 138 sets the staple position to the upper right in accordance with the input of the setting value ("upper right"). Specifically, a plurality of sheets of paper is stapled at a position of upper right.

The type of the staple adjustment can be set to any number depending on the type of the image forming apparatus 1.

In contrast, the voice content of the voice input that has been input via the microphone 106 sometimes does not contain a setting value. In one example, it is assumed that a setting value (lower right) is not provided.

For example, when a voice input ("staple adjustment lower right") is input via the microphone 106, the image forming apparatus 1 outputs the voice input to the voice analyzer 130. The voice analyzer 130 analyzes the voice content of the voice input. The function determiner 132 determines that the staple adjustment function has been selected based on the voice content of the voice input ("staple adjustment") based on the analysis result from the voice analyzer 130. The setting determiner 134 determines whether a setting value of the staple adjustment has been input based on the analysis result from the voice analyzer 130. The setting determiner 134 determines that a setting value has not been input. When determining that a setting value has not been input, the setting determiner 134 outputs the fact to the display controller 136.

When a selection of no input of a setting value is performed, the display controller 136 displays a selection screen on the display panel 105.

Figure 9:
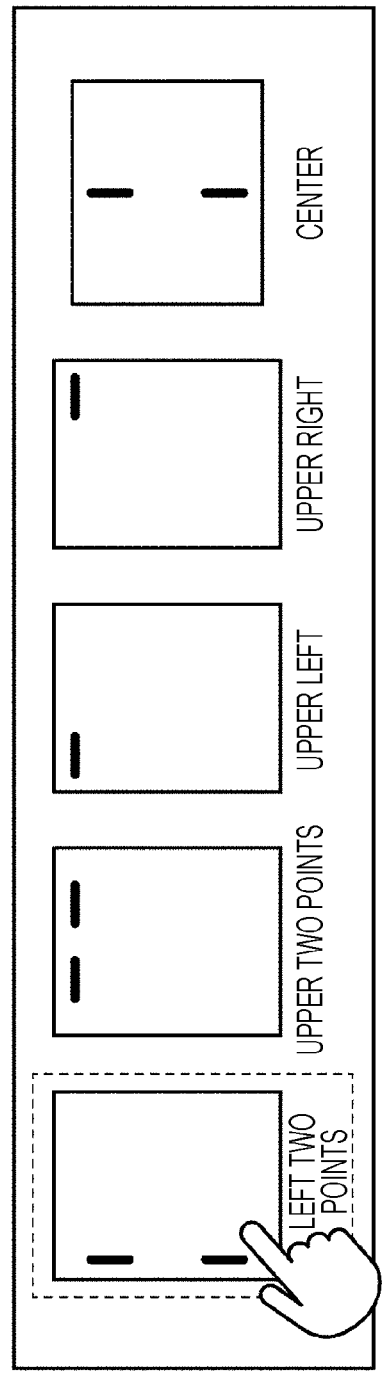
FIG. 9 illustrates a selection screen for brightness adjustment according to the embodiment.

FIG. 9 illustrates a selection screen for staple adjustment according to the embodiment.

Referring to FIG. 9, in the example, a case where the staple adjustment function of two-point stapling in FIG. 8A is provided will be described.

Five setting candidates whose staple position has been adjusted are displayed as preview images on the selection screen in the example.

Specifically, the display controller 136 displays a preview image whose staple position has been adjusted in accordance with setting values ("left two points", "upper two points", "upper left", "upper right", and "center") on the display panel 105.

A user can select one of the plurality of setting candidates displayed on the display panel 105 via a touch panel. In the example, a state in which a preview image whose staple position has been adjusted in accordance with a setting value ("left two points") is selected is illustrated.

Although, in the example, a case where a setting candidate can be selected via the touch panel has been described, this is not a limitation. The setting candidate can be selected by voice input via the microphone 106. For example, when the voice input ("left two points") is input via the microphone 106, it is determined that a preview image ("left two points") whose staple position has been adjusted is selected, and the staple position is adjusted.

Figure 10:
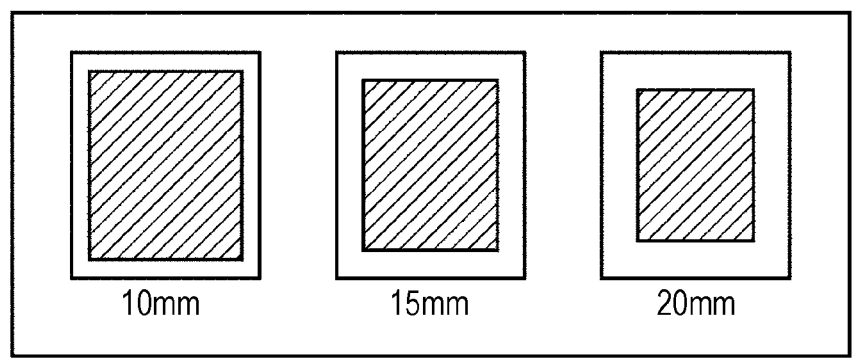
FIG. 10 illustrates a margin adjustment function of the image forming apparatus according to the embodiment.

FIG. 10 illustrates a margin adjustment function of the image forming apparatus 1 according to the embodiment.

The margin adjustment function is a function of adjusting an amount of surrounding margin at the time when image data is printed on paper.

FIG. 10 illustrates a case where a margin amount can be adjusted by the margin adjustment function of the image forming apparatus 1. In the example, a case where three types of margin adjustments are set is illustrated. Specifically, "10 mm", "15 mm", and "20 mm" are illustrated as the margin amounts.

For example, when a voice input ("margin adjustment 10 mm") is input via the microphone 106, the image forming apparatus 1 outputs the voice input to the voice analyzer 130. The voice analyzer 130 analyzes the voice content of the voice input. The function determiner 132 determines that the margin adjustment function is selected based on the voice content of the voice input ("margin adjustment") based on the analysis result from the voice analyzer 130. The setting determiner 134 determines whether a setting value ("10 mm") of the margin adjustment has been input based on the analysis result from the voice analyzer 130. The setting determiner 134 determines that the setting value ("10 mm") has been input, and outputs the setting content to the setting processor 138. The setting processor 138 sets the margin amount to 10 mm in accordance with the input of the setting value ("10 mm"). Specifically, a surrounding margin amount of 10 mm of paper is secured, and image data is printed inside the margin.

The adjustment of margin amount can be optionally set by the image forming apparatus 1.

In contrast, the voice content of the voice input that has been input via the microphone 106 sometimes does not contain a setting value. In one example, it is assumed that a setting value (100 mm) is not provided.

For example, when a voice input ("margin adjustment 100 mm") is input via the microphone 106, the image forming apparatus 1 outputs the voice input to the voice analyzer 130. The voice analyzer 130 analyzes the voice content of the voice input. The function determiner 132 determines that the margin adjustment function is selected based on the voice content of the voice input ("margin adjustment") based on the analysis result from the voice analyzer 130. The setting determiner 134 determines whether a setting value of the margin adjustment has been input based on the analysis result from the voice analyzer 130. The setting determiner 134 determines that a setting value has not been input. When determining that a setting value has not been input, the setting determiner 134 outputs the fact to the display controller 136.

When a selection of no input of a setting value is performed, the display controller 136 displays a selection screen on the display panel 105.

Specifically, three setting candidates whose margin amount has been adjusted can be displayed as preview images as illustrated in FIG. 10.

Specifically, the display controller 136 displays a preview image whose margin amount has been adjusted in accordance with setting values ("10 mm", "15 mm", and "20 mm") on the display panel 105.

A user can select one of the plurality of setting candidates displayed on the display panel 105 via a touch panel. The user can select the setting candidate by voice input via the microphone 106.

Figure 11:
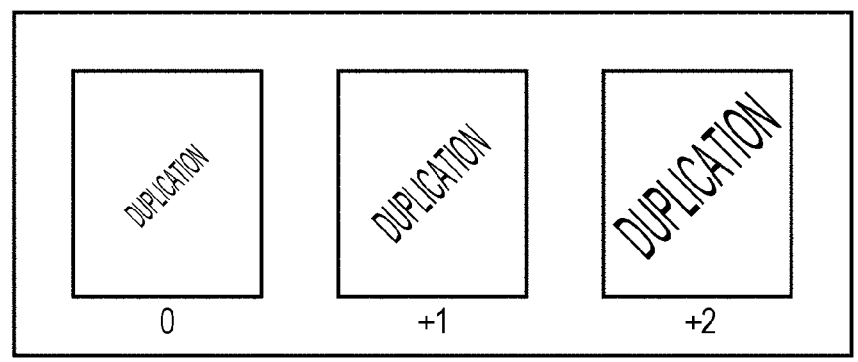
FIG. 11 illustrates an image composition adjustment function of the image forming apparatus according to the embodiment.

FIG. 11 illustrates an image composition adjustment function of the image forming apparatus 1 according to the embodiment.

The image composition function is a function of composing predetermined image data at the time when the image data is printed on paper.

FIG. 11 illustrates a case where image data containing characters of "duplication" can be composed by the image composition function of the image forming apparatus 1. In the example, a case where three types of composition adjustments are set is illustrated. Specifically, "0", "+1", and "+2" are illustrated as the setting values of the size of image data.

For example, when a voice input ("image composition 1") is input via the microphone 106, the image forming apparatus 1 outputs the voice input to the voice analyzer 130. The voice analyzer 130 analyzes the voice content of the voice input. The function determiner 132 determines that the image composition adjustment function has been selected based on the voice content of the voice input ("image composition") based on the analysis result from the voice analyzer 130. The setting determiner 134 determines whether a setting value ("1") of the image composition adjustment has been input based on the analysis result from the voice analyzer 130. The setting determiner 134 determines that the setting value ("1") has been input, and outputs the setting content to the setting processor 138. The setting processor 138 sets the size of image data in accordance with the input of the setting value ("1"). Specifically, composite image data composed by adjusting the size of the image data ("duplication") is printed on paper.

The adjustment of the sizes of image data can be optionally set by the image forming apparatus 1.

In contrast, the voice content of the voice input that has been input via the microphone 106 sometimes does not contain a setting value. In one example, it is assumed that a setting value ("3") is not provided.

For example, when a voice input ("image composition 3") is input via the microphone 106, the image forming apparatus 1 outputs the voice input to the voice analyzer 130. The voice analyzer 130 analyzes the voice content of the voice input. The function determiner 132 determines that the image composition adjustment function has been selected based on the voice content of the voice input ("image composition") based on the analysis result from the voice analyzer 130. The setting determiner 134 determines whether a setting value of the image composition adjustment has been input based on the analysis result from the voice analyzer 130. The setting determiner 134 determines that a setting value has not been input. When determining that a setting value has not been input, the setting determiner 134 outputs the fact to the display controller 136.

When a selection of no input of a setting value is performed, the display controller 136 displays a selection screen on the display panel 105.

Specifically, three setting candidates in which the size of image data for image composition has been adjusted can be displayed as preview images as illustrated in FIG. 11.

Specifically, the display controller 136 displays a preview image in which the size of the image data has been adjusted in accordance with setting values ("0", "+1", and "+2") on the display panel 105.

A user can select one of the plurality of setting candidates displayed on the display panel 105 via a touch panel. The user can select the setting candidate by voice input via the microphone 106.

Although, in the example, the case where the image data containing the characters of "duplication" is composed is described in one example, this is not particularly a limitation. Image data containing characters of "invalid", "confidential", "strict secrecy", "copy", "internal use only", "draft", and "handle with care" may be composed. A selection screen on which the characters can be selected may be provided.

Figure 12:
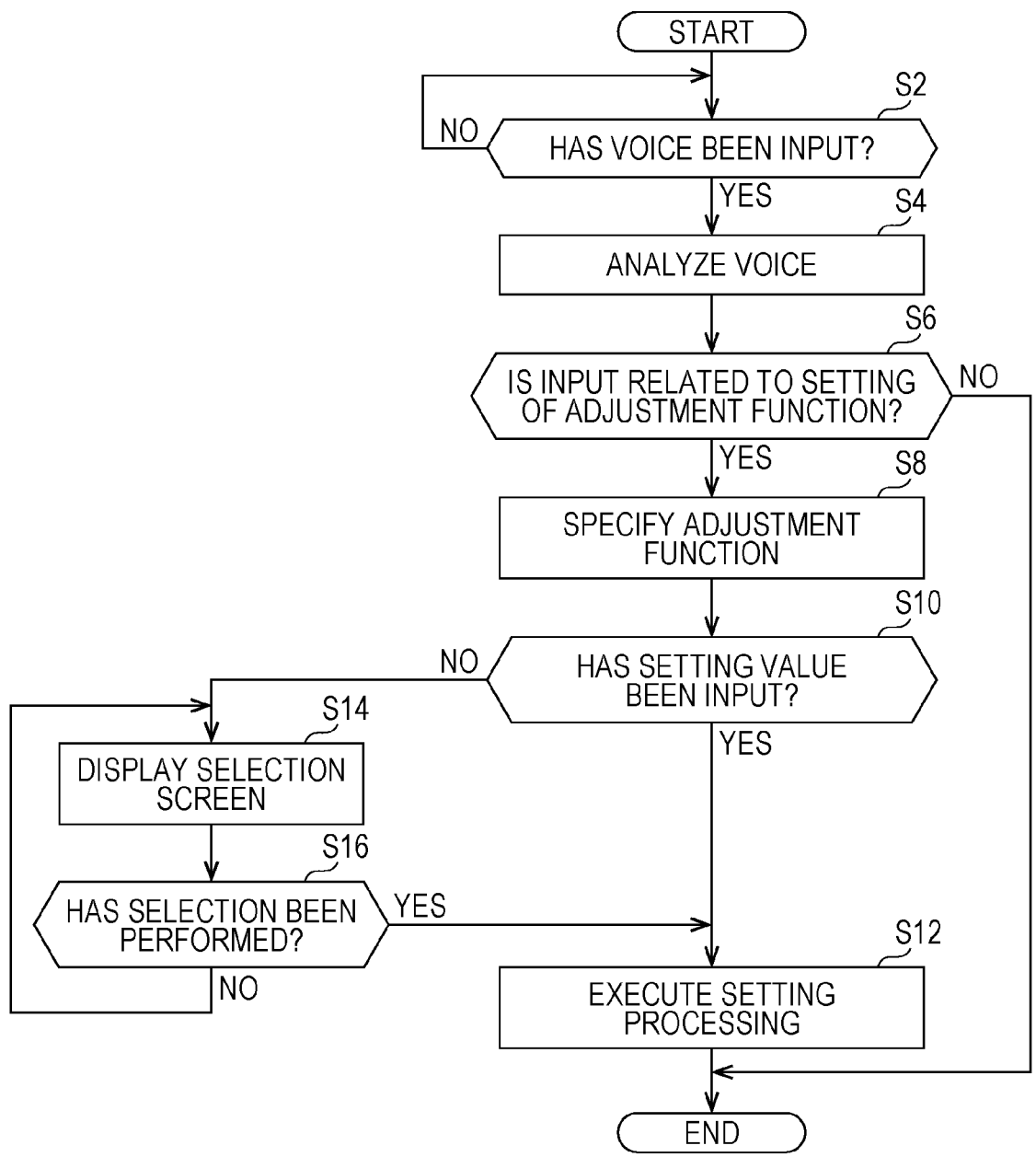
FIG. 12 is a flowchart illustrating setting processing by voice input of a plurality of adjustment functions provided in the image forming apparatus according to the embodiment.

FIG. 12 is a flowchart illustrating setting processing by voice input of a plurality of adjustment functions provided in the image forming apparatus 1 according to the embodiment.

Referring to FIG. 12, the image forming apparatus 1 determines whether voice has been input (Step S2). Specifically, the control device 101 determines whether voice has been input by a user via the microphone 106.

When it is determined that voice has been input (YES in Step S2), the image forming apparatus 1 executes voice analysis processing of analyzing the received voice content (Step S4). The voice analyzer 130 executes the voice analysis processing of analyzing the voice content of voice input via the microphone 106.

The image forming apparatus 1 determines whether the input is related to setting of one of a plurality of adjustment functions based on the analysis result obtained by the analysis of the voice analysis processing (Step S6).

The function determiner 132 determines whether the voice content of voice input contains input regarding setting of one of a plurality of adjustment functions based on the analysis result. For example, the function determiner 132 determines whether the analyzed voice content contains voice input such as "brightness adjustment", "contrast adjustment", "staple adjustment", "margin adjustment", and "image synthesis".

In Step S6, when determining the input is related to setting of one of a plurality of adjustment functions (YES in Step S6), the image forming apparatus 1 proceeds to the next Step S8.

In contrast, in Step S6, when determining that the input is not related to setting of one of a plurality of adjustment functions (NO in Step S6), the image forming apparatus 1 ends the processing (end). When determining that the analyzed voice content does not contain voice input such as "brightness adjustment", "contrast adjustment", "staple adjustment", "margin adjustment", and "image synthesis", the function determiner 132 ends the processing.

In Step S8, the image forming apparatus 1 specifies an adjustment function (Step S8). When the analyzed voice content contains voice input such as "brightness adjustment", "contrast adjustment", "staple adjustment", "margin adjustment", and "image synthesis", the function determiner 132 specifies the adjustment function.

The image forming apparatus 1 determines whether a setting value of the specified adjustment function has been input (Step S10). The setting determiner 134 determines whether the voice content contains the input of a setting value of an adjustment function that has been specified based on the determination result from the function determiner 132. For example, when the brightness adjustment function is selected, the setting determiner 134 determines whether the voice content contains input of a setting value "−2 to +2".

In Step S10, when determining that a setting value of the specified adjustment function has been input (YES in Step S10), the image forming apparatus 1 executes setting processing (Step S12). When determining that the voice content contains the input of a setting value of an adjustment function that has been specified based on the determination result from the function determiner 132, the setting determiner 134 outputs the information to the setting processor 138. The setting processor 138 executes setting processing in accordance with the input of the setting value. For example, the setting processor 138 adjusts the brightness of image data in accordance with the input of the setting value ("+2"). Specifically, the brightness of the image data is adjusted to be doubled.

The processing ends.

In contrast, in Step S10, when determining that a setting value of the specified adjustment function has not been input (NO in Step S10), the image forming apparatus 1 displays a selection screen (Step S14). When determining that the voice content does not contain the input of a setting value of an adjustment function that has been specified based on the determination result from the function determiner 132, the setting determiner 134 outputs the fact to the display controller 136. When a setting value has not been input, the display controller 136 displays a selection screen on the display panel 105.

The image forming apparatus 1 determines whether selection has been performed on the selection screen (Step S16). The setting determiner 134 determines whether the input of the setting value of the specified adjustment function has been selected on the selection screen.

In Step S16, when determining that selection has been performed on the selection screen (YES in Step S14), the image forming apparatus 1 executes setting processing (Step S12). The processing ends. When the input of the setting value of the specified adjustment function has been selected on the selection screen, the setting determiner 134 outputs the information to the setting processor 138. The setting processor 138 executes setting processing in accordance with the input of the setting value.

In contrast, in Step S16, when determining that selection has not been performed on the selection screen (NO in Step S16), the image forming apparatus 1 returns to Step S14, and repeats the processing. The setting determiner 134 keeps the state until the input of the setting value of the specified adjustment function has been selected on the selection screen.

According to the method of the embodiment, for example, when a user sets the adjustment function, and inputs voice without a setting value, the selection screen is displayed. The selection screen enables the user to make an adjustment in accordance with an appropriate setting value, thereby improving user convenience. A plurality of setting candidates in accordance with a setting value is displayed on the selection screen. This enables easy setting of the adjustment function.

When a user inputs voice indicating that there is a setting value at the time of setting the adjustment function, setting processing is executed without displaying the selection screen. This enables the setting to be completed early.

Although a case, where a selection screen is displayed, for example, when the user inputs voice indicating that there is no setting value at the time of setting the adjustment function by a method according to the embodiment, has been described, a warning indicating that input without a setting value has been performed can be displayed on the display panel 105 in addition to the selection screen. This enables the user to be alerted that the input without a setting value has been performed. The warning may be issued not by display but by voice, and may be given by light. The same applies to other cases.

Although a case, where setting processing is executed, for example, when it is determined the voice content contains the input of a setting value at the time when a user sets the adjustment function by a method according to the embodiment, has been described, setting processing may be executed even when input of the setting value does not completely contain the voice content. For example, when the voice content contains input approximating a setting value, the setting processing may be executed. The setting value may have a predetermined width as an approximate input.

[Variation 1]

In the above-described embodiment, a case, where setting processing is executed in the case where it is determined that voice content contains input of a setting value of a specified adjustment function, has been described.

In contrast, it may be desirable to confirm, to a user, whether an adjustment function is set in an imaged manner.

The image forming apparatus according to a variation 1 of the embodiment displays a preview screen when determining that voice content contains input of a setting value of a specified adjustment function.

Figure 13:
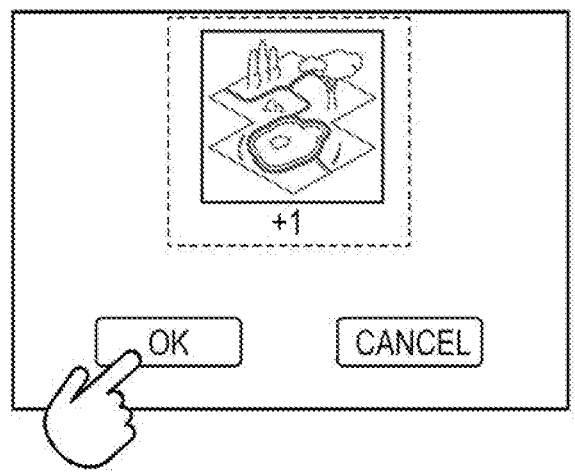
FIG. 13 illustrates a preview screen according to a variation 1 of the embodiment.

FIG. 13 illustrates a preview screen according to a variation 1 of the embodiment.

Referring to FIG. 13, in the example, the display controller 136 displays a setting candidate (preview image) whose brightness has been adjusted on the display panel 105 in accordance with input of a setting value ("+1") in one example in the setting of the brightness adjustment function.

A user can confirm an instruction content by looking at the setting candidate (preview image) displayed on the display panel 105. In the example, a state, in which a setting candidate (preview image) whose brightness has been adjusted in accordance with a setting value ("+1") is selected by an "OK" button, is illustrated. When a "cancel" button is selected, setting processing is canceled.

Although, in the example, a case where selection is performed via a touch panel has been described, this is not a limitation. The selection can be performed by voice input via the microphone 106. For example, when the voice input ("OK") is input via the microphone 106, it is determined that a preview image ("+1") whose brightness has been adjusted is selected, and the brightness of the image data is adjusted.

Figure 14:
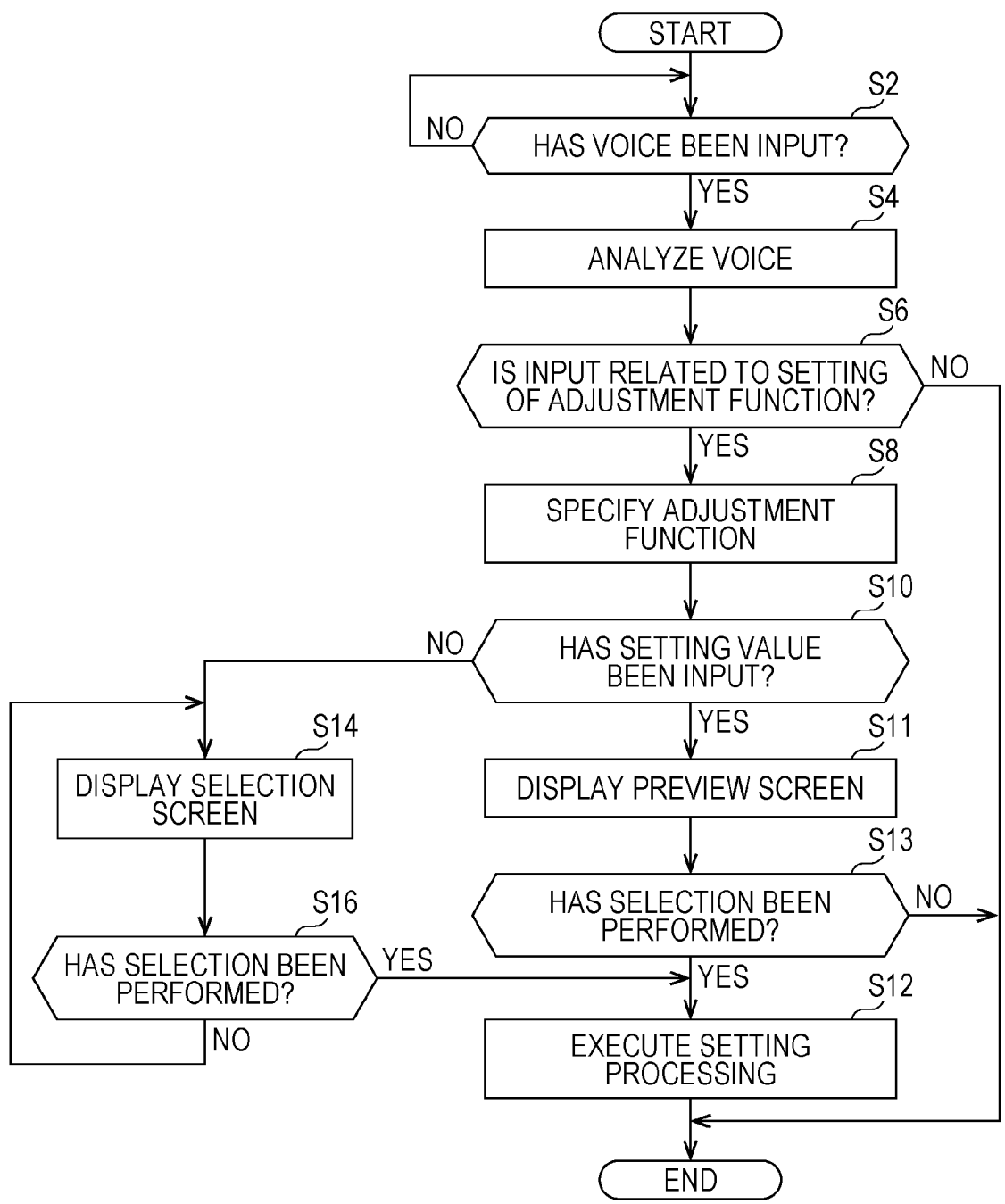
FIG. 14 is a flowchart illustrating setting processing by voice input of a plurality of adjustment functions provided in the image forming apparatus according to the variation 1 of the embodiment.

FIG. 14 is a flowchart illustrating setting processing by voice input of a plurality of adjustment functions provided in the image forming apparatus 1 according to the variation 1 of the embodiment.

Referring to FIG. 14, there is a difference in that Steps S11 and S13 are added compared to the flowchart of FIG. 12. Other points are the same as those described with reference to FIG. 12, and thus, detailed description thereof will not be repeated.

In Step S10, when determining that a setting value of the specified adjustment function has been input (YES in Step S10), the image forming apparatus 1 displays a preview screen (Step S11). As described with reference to FIG. 13, the display controller 136 displays the preview screen on the display panel 105 in accordance with input of a setting value.

The image forming apparatus 1 determines whether a setting candidate displayed on the preview screen has been selected (Step S13). The setting determiner 134 determines whether a setting candidate has been selected on the preview screen. In one example, it is determined whether an "OK" button has been selected.

In Step S13, when determining that a setting candidate has been selected (YES in Step S13), the image forming apparatus 1 executes setting processing (Step S12). The processing ends. When a setting candidate has been selected on the preview screen, the setting determiner 134 outputs the information to the setting processor 138. The setting processor 138 executes setting processing in accordance with the input of the setting value.

In contrast, when determining that a setting candidate has not been selected in Step S13 (NO in Step S13), the image forming apparatus 1 ends the processing (end). For example, when a "cancel" button is selected, the setting processor 138 ends the processing.

[Variation 2]

Although, in the above-described embodiment, a configuration in which a plurality of setting candidates are displayed on a selection screen has been described, this is not a limitation. A selection screen on which a user can directly adjust a setting value may be provided.

Figure 15A:
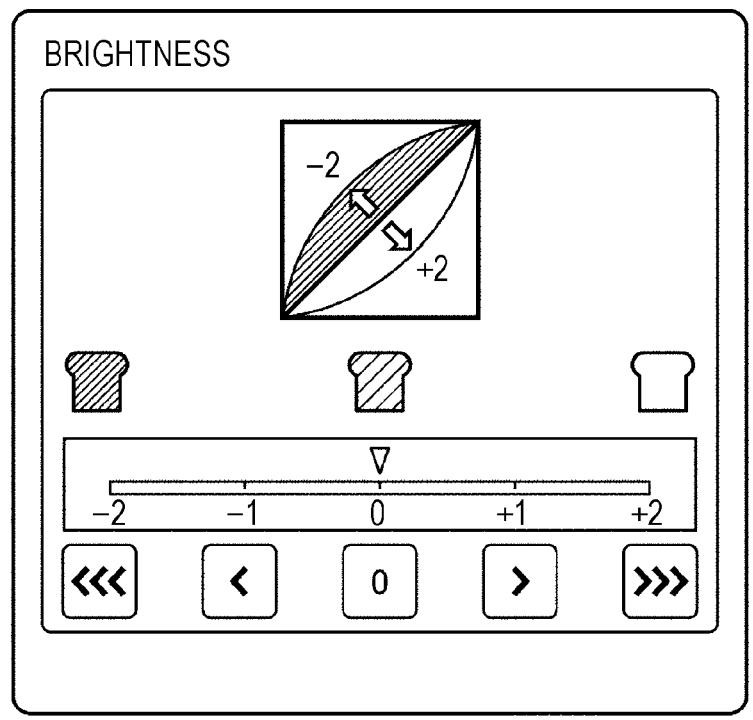
FIGS. 15A and 15B illustrate preview screens according to a variation 2 of the embodiment.
Figure 15B:
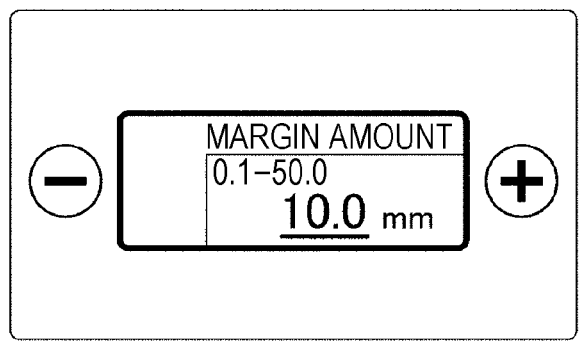

FIGS. 15A and 15B illustrate selection screens according to a variation 2 of the embodiment.

Referring to FIG. 15A, in the example, a selection screen for brightness adjustment is illustrated.

A user can directly adjust the parameter of a setting value ("−2 to +2").

Referring to FIG. 15B, in the example, a selection screen for margin adjustment is illustrated.

A user can directly adjust the parameter of a margin amount (0.1 to 50.0 mm) which is a setting value.

When there are many setting values that can be set, the selection screen can improve user convenience.

[Variation 3]

In the above-described embodiment, a case where a user can input voice input ("default") via the microphone 106 has been described.

In this case, it is determined that an initially set setting value (e.g., "0") has been input, but the initially set setting value may be changed later. In this case, a value that has been changed from the initially set setting value may be used for the voice input ("default"), and an unintended adjustment function may be set.

When an initially set setting value has been changed, a warning of the fact is desirably given.

Figure 16:
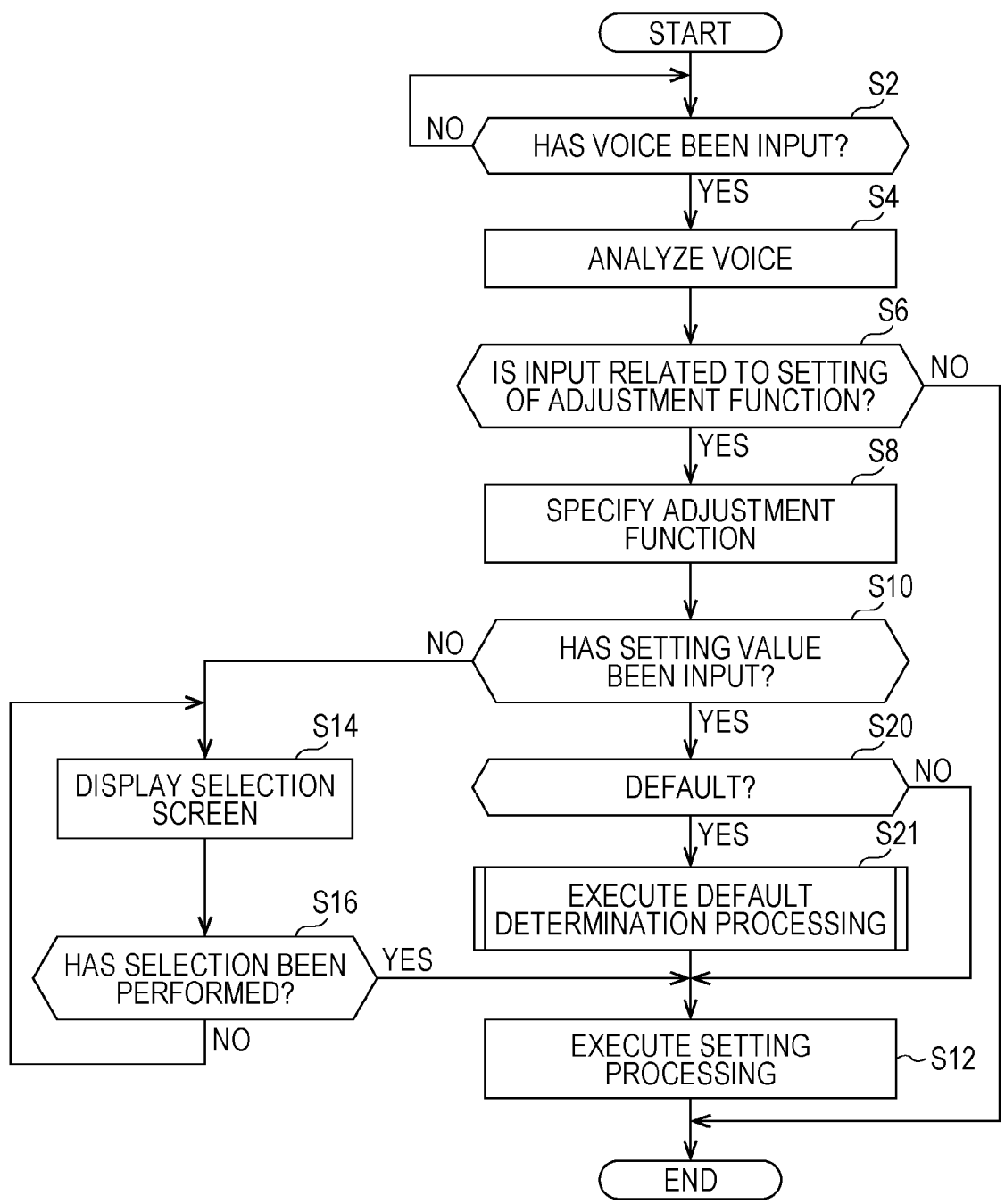
FIG. 16 is a flowchart illustrating setting processing by voice input of a plurality of adjustment functions provided in the image forming apparatus according to a variation 3 of the embodiment.

FIG. 16 is a flowchart illustrating setting processing by voice input of a plurality of adjustment functions provided in the image forming apparatus 1 according to a variation 3 of the embodiment.

Referring to FIG. 16, there is a difference in that Steps S20 and S21 are added compared to the flowchart of FIG. 12. Other points are the same as those described with reference to FIG. 12, and thus, detailed description thereof will not be repeated.

In Step S10, when determining that a setting value of the specified adjustment function has been input (YES in Step S10), the image forming apparatus 1 determines whether the input of a setting value is "default" (Step S20). The setting determiner 134 determines whether the input of the setting value is "default".

When determining that the input of the setting value is the default (YES in Step S20), the image forming apparatus 1 executes default determination processing (Step S21).

The image forming apparatus 1 executes setting processing (Step S12).

Figure 17:
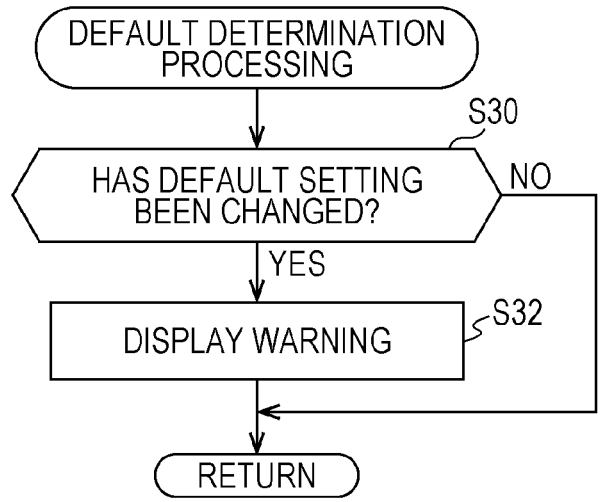
FIG. 17 is a flowchart illustrating default determination processing according to the variation 3 of the embodiment.

FIG. 17 is a flowchart illustrating default determination processing according to the variation 3 of the embodiment.

Referring to FIG. 17, the setting determiner 134 determines whether the default setting has been changed (Step S30). Specifically, the setting determiner 134 compares the currently set setting value of default with the initially set setting value stored in, for example, the ROM 102 to determine whether the setting values match each other. The setting determiner 134 may determine that no change has been performed when the setting values match each other, and determine that change has been performed when the setting values do not match each other.

When determining that setting of default has been changed in Step S30 (YES in Step S30), the setting determiner 134 instructs the display controller 136 to display a warning. The display controller 136 displays the fact that the default of the setting value has been changed on the display panel 105 in accordance with the instruction.

The processing ends (return).

In contrast, when determining that setting of default has not been changed in Step S30 (NO in Step S30), the setting determiner 134 ends the processing (return).

The processing enables a user to be alerted that input of the setting value has been changed, and setting of unintended adjustment function can be inhibited.

(Other Forms)

Figure 18:
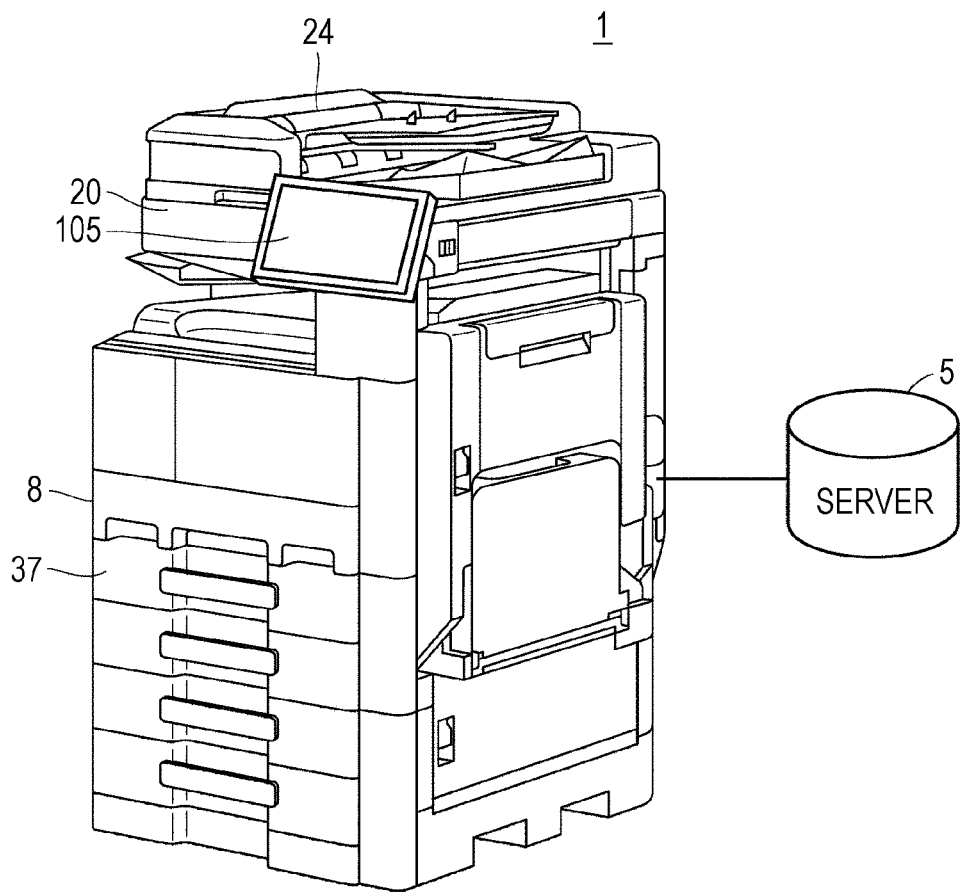
FIG. 18 illustrates an image forming system according to another form.

FIG. 18 illustrates an image forming system according to another form.

Referring to FIG. 18, the image forming system includes the image forming apparatus 1 and a server 5. The server 5 is provided so as to be able to communicate with the image forming apparatus 1.

The server 5 executes various pieces of processing in cooperation with the image forming apparatus 1.

Specifically, the server 5 may execute processing of a part or all of functional blocks of the control device 101 described with reference to FIG. 5.

Although the embodiment of the present invention has been described and illustrated in detail, it should be considered that the embodiment disclosed here is made for purposes of illustration and example only in all respects and not limitation. The scope of the present invention should be interpreted by terms of the appended claims. It is intended that the scope of the present invention is indicated not by the above description but by the claims, and all modifications which fall within the meaning and scope equivalent to the claims are contained in the scope of the invention.

What is claimed is:

1. An image forming system comprising:
a display panel;
a voice inputter that receives an instruction by voice; and
a hardware processor that:
analyzes a voice content that has been received by the voice inputter;
determines whether a setting of one of a plurality of adjustment functions preliminarily provided in the image forming system has been input based on an analysis result of the voice content;
determines whether the voice content contains an input of a setting value of the one of the plurality of adjustment functions that has been determined to be input; and
displays a selection screen on the display panel based on a result of a determination that the setting of the one of the plurality of adjustment functions has been input but the voice content does not contain the input of the setting value of the one of the plurality of adjustment functions that has been determined to be input,
wherein the selection screen comprises a setting candidate in which the adjustment function has been adjusted in accordance with the setting value as a preview image.

2. The image forming system according to claim 1,
wherein, based on the result of the determination that the voice content does not contain the input of the setting value of the one of the plurality of adjustment functions that has been determined to be input, the hardware processor displays the selection screen, on which a parameter is allowed to be adjusted, on the display panel.

3. The image forming system according to claim 1,
wherein, the setting candidate includes a plurality of setting candidates, and
based on the result of the determination that the voice content does not contain the input of the setting value of the one of the plurality of adjustment functions that has been determined to be input, the hardware processor displays the selection screen, on which one of the plurality of setting candidates is allowed to be selected, on the display panel.

4. The image forming system according to claim 3,
wherein, based on the result of the determination that the voice content does not contain the input of the setting value of the one of the plurality of adjustment functions that has been determined to be input, the hardware processor displays the selection screen, on which one of the plurality of setting candidates is allowed to be selected in accordance with at least any one of voice input and an operation instruction, on the display panel.

5. The image forming system according to claim 3,
wherein, based on a determination result that the input of the setting value of the one of the plurality of adjustment functions that has been determined to be input is a predetermined value, the hardware processor determines whether the predetermined value has been changed, and displays a warning based on the determination result.

6. The image forming system according to claim 1,
wherein the hardware processor executes setting processing using the setting value based on a result of a determination that the voice content contains the input of the setting value of the one of the plurality of adjustment functions that has been determined to be input.

7. The image forming system according to claim 1,
wherein, based on a result of a determination that the voice content contains the input of the setting value of the one of the plurality of adjustment functions that has been determined to be input, the hardware processor displays the setting candidate drawn by the setting value.

8. The image forming system according to claim 1,
wherein, based on the result of the determination that the voice content does not contain the input of the setting value of the one of the plurality of adjustment functions that has been determined to be input, the hardware processor displays a warning together with the selection screen on the display panel.

9. The image forming system according to claim 1,
wherein, based on a result of a determination that an input value contained in the voice content approximates the setting value, the hardware processor determines that the voice content contains the input of the setting value.

10. The image forming system according to claim 1,
wherein at least one or more of the adjustment functions preliminarily provided in the image forming system includes at least two or more of brightness adjustment, contrast adjustment, image quality adjustment, finishing adjustment, margin adjustment, and image composition.

11. An image forming apparatus comprising:
a display panel;
a voice inputter that receives an instruction by voice; and
a hardware processor that:
analyzes a voice content that has been received by the voice inputter;
determines whether a setting of one of a plurality of adjustment functions preliminarily provided in the image forming apparatus has been input based on an analysis result of the voice content;
determines whether the voice content contains an input of a setting value of the one of the plurality of adjustment functions that has been determined to be input; and
displays a selection screen on the display panel based on a result of a determination that the setting of the one of the plurality of adjustment functions has been input but the voice content does not contain the input of the setting value of the one of the plurality of adjustment functions that has been determined to be input, wherein the selection screen comprises a setting candidate in which the adjustment function has been adjusted in accordance with the setting value as a preview image.

\* \* \* \* \*